(12) United States Patent
Kuroshima

(10) Patent No.: US 9,197,765 B2
(45) Date of Patent: Nov. 24, 2015

(54) MANAGEMENT APPARATUS, MANAGEMENT METHOD, AND PROGRAM

(75) Inventor: Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 13/109,881

(22) Filed: May 17, 2011

(65) Prior Publication Data

US 2011/0286041 A1 Nov. 24, 2011

(30) Foreign Application Priority Data

May 21, 2010 (JP) ................................ 2010-117427

(51) Int. Cl.
G06F 3/12 (2006.01)
G06K 15/00 (2006.01)
H04N 1/00 (2006.01)

(52) U.S. Cl.
CPC ............ *H04N 1/00204* (2013.01); *G06F 3/127* (2013.01); *G06F 3/1207* (2013.01); *G06F 3/1259* (2013.01); *G06F 3/1288* (2013.01); *H04N 1/00233* (2013.01); *H04N 1/00244* (2013.01); *H04N 1/00944* (2013.01); *H04N 1/00946* (2013.01); *G06F 3/1204* (2013.01); *G06F 3/1274* (2013.01); *H04N 2201/0094* (2013.01)

(58) Field of Classification Search
CPC ..... G06F 3/1204; G06F 3/1205; G06F 3/127; G06F 3/1285; G06F 3/1253; G06F 3/1294; H04N 1/00944; H04N 1/00946; H04N 1/3229
USPC .......... 358/1.1, 1.9, 2.1, 1.11–1.18, 406, 504; 399/8–12
See application file for complete search history.

(56) References Cited

U.S. PATENT DOCUMENTS

| | | | | |
|---|---|---|---|---|
| 5,625,757 | A * | 4/1997 | Kageyama et al. | 358/1.14 |
| 2001/0052995 | A1* | 12/2001 | Idehara | 358/1.15 |
| 2003/0107756 | A1* | 6/2003 | Dan et al. | 358/1.14 |
| 2004/0190042 | A1* | 9/2004 | Ferlitsch et al. | 358/1.15 |
| 2006/0176498 | A1* | 8/2006 | Wada et al. | 358/1.13 |
| 2007/0143354 | A1* | 6/2007 | Morooka | 707/200 |
| 2008/0297833 | A1* | 12/2008 | Hatakeyama | 358/1.15 |
| 2009/0051947 | A1* | 2/2009 | Kuroshima | 358/1.9 |
| 2009/0279143 | A1* | 11/2009 | St. Jacques et al. | 358/3.28 |
| 2010/0039668 | A1* | 2/2010 | Kayama | 358/1.15 |
| 2010/0110493 | A1* | 5/2010 | Kato | 358/1.15 |

FOREIGN PATENT DOCUMENTS

| | | |
|---|---|---|
| CN | 1815435 A | 8/2006 |
| CN | 101276263 A | 10/2008 |

(Continued)

*Primary Examiner* — Chad Dickerson
(74) *Attorney, Agent, or Firm* — Canon USA, Inc. IP Division

(57) ABSTRACT

A management apparatus includes a reception unit configured to receive file information about a file input into a folder, a transmission unit configured to generate print job information including the file information and transmit the print job information to an image forming apparatus that is associated with the folder in advance, a job monitoring unit configured to monitor whether printing of a job corresponding to the file information included in the print job information by the image forming apparatus has finished based on printing progress information received from the image forming apparatus, and a folder management unit configured to, if printing of the job is determined by the job monitoring unit to have finished, delete the file information corresponding to the job from the folder.

11 Claims, 19 Drawing Sheets

(56) References Cited

FOREIGN PATENT DOCUMENTS

| | | | |
|---|---|---|---|
| CN | 101315596 A | 12/2008 | |
| JP | 2002-358184 A | 12/2002 | |
| JP | 2005-352901 A | 12/2005 | |
| JP | 2006-222661 A | 8/2006 | |
| JP | 2007-011570 A | 1/2007 | |

* cited by examiner

FIG.16

| DEVICE STATUS RECORDING UNIT | ~159 |
| --- | --- |
| STATUS TYPE: NO SHEET | ~15a |
| STATUS DETAILS: THICK PAPER (120 TO 140 g/m$^2$) | ~15b |

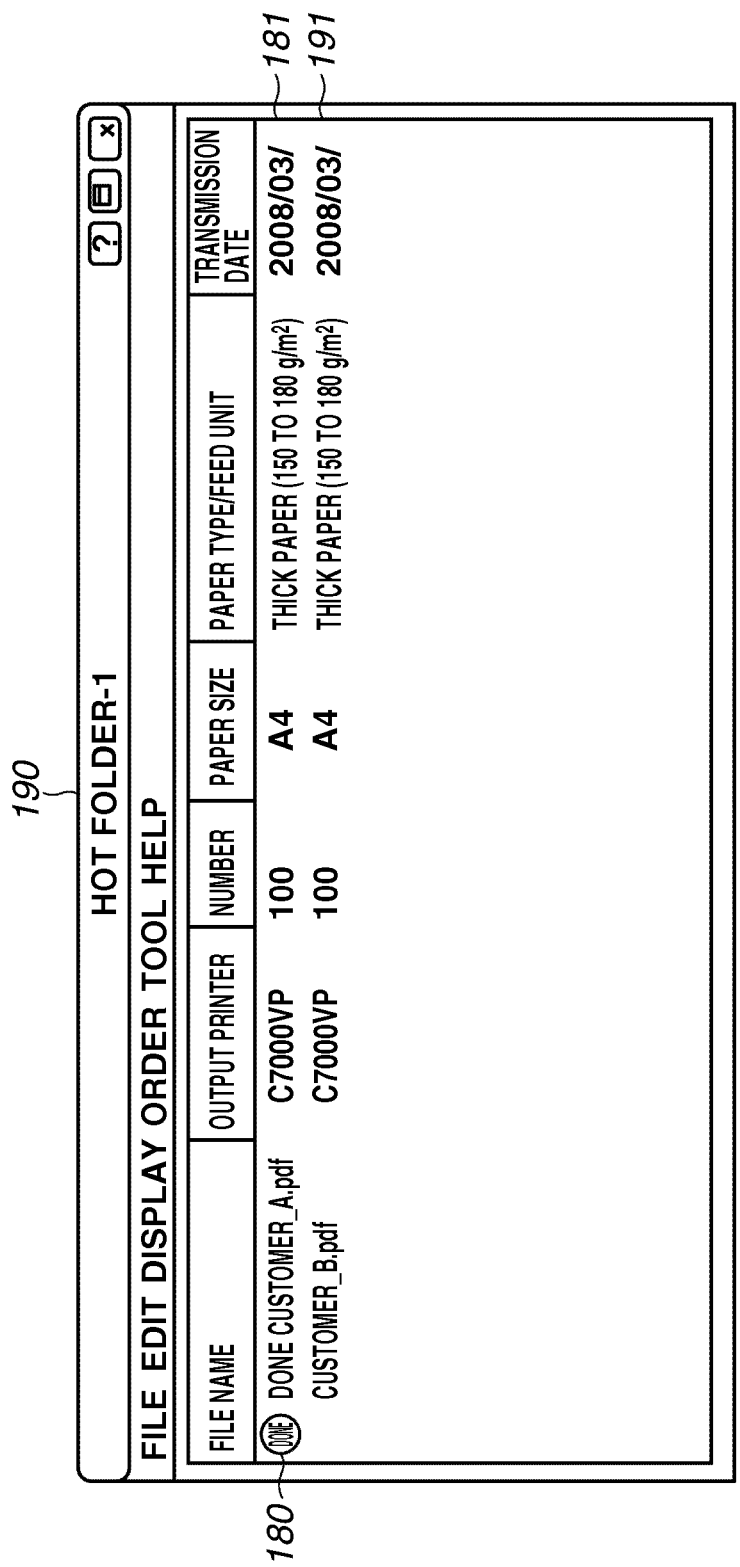

MANAGEMENT APPARATUS, MANAGEMENT METHOD, AND PROGRAM

BACKGROUND OF THE INVENTION

1. Field of the Invention

The present invention relates to a management apparatus, a management method, and a program.

2. Description of the Related Art

There is a system which gives a folder a name indicating that print preparation is still ongoing until a file to be printed and printing instruction information which are sufficient to start printing are prepared, and when print preparation is completed, changes the folder name to a name indicating completion of the print preparation (for example, see Japanese Patent Application Laid-Open No. 2006-222661).

However, in the above conventional art, the user does not know whether printing of the input file has finished. More specifically, it is difficult for the user to appropriately determine whether the printing of the file that was input into the folder has finished or not.

SUMMARY OF THE INVENTION

The present invention features, among other things, enabling a user to easily and appropriately determine whether the printing of a file that was input into a folder has finished.

According to an aspect of the present invention, a management apparatus includes a reception unit configured to receive file information about a file input into a folder, a transmission unit configured to generate print job information including the file information and transmit the print job information to an image forming apparatus that is associated with the folder in advance, a job monitoring unit configured to monitor whether printing of a job corresponding to the file information included in the print job information by the image forming apparatus has finished based on printing progress information received from the image forming apparatus, and a folder management unit configured to, if printing of the job is determined by the job monitoring unit to have finished, delete the file information corresponding to the job from the folder.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 illustrates an example of a device status recording unit.

FIG. 19 illustrates a display example of a screen in a display device.

DESCRIPTION OF THE EMBODIMENTS

Various exemplary embodiments, features, and aspects of the invention will be described in detail below with reference to the drawings.

Figure 1:
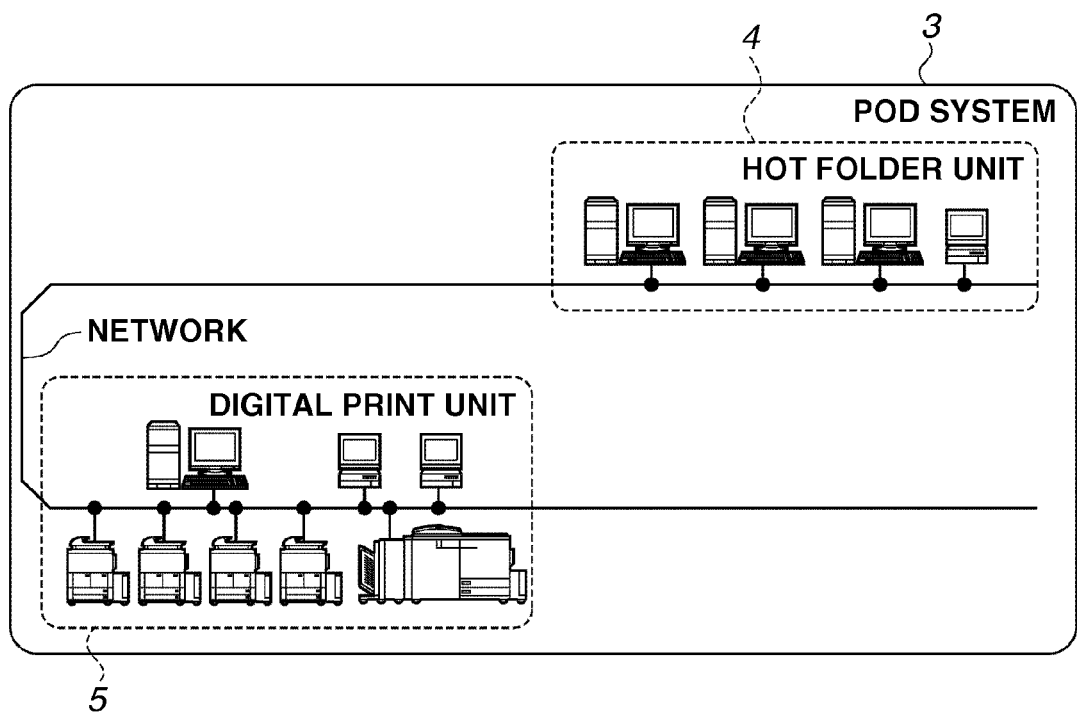
FIG. 1 illustrates an example of a print on demand (POD) system configuration.

FIG. 1 illustrates an example of the configuration of a print on demand (POD) system 3 that uses a hot folder (HF). The POD system 3 includes a hot folder unit 4 and a digital print unit 5. To augment the functions or the performance of a finishing apparatus that may be connected to a digital image forming apparatus, such as a digital copying machine or a digital multifunction peripheral, the POD system 3 may also include a postpress unit.

The POD system 3 includes an upstream system for generating contents in the hot folder unit 4. The hot folder unit 4 generates a print job (print job information) by attaching a print instruction to a content file received from the upstream system, and transfers the generated print job to the digital print unit 5. Further, the hot folder unit 4 performs process management. More specifically, the hot folder unit 4 issues a work instruction for each of the process to be performed by the hot folder unit 4 and the digital print unit 5 (and for the postpress unit if it is included in the configuration), and consolidates the management of the workflow of the POD system 3. In addition, the hot folder unit 4 stores the print jobs and efficiently schedules the work for each device (digital image forming apparatus) and each operator.

The digital print unit 5 executes print processing based on a print instruction (work instruction) of the print job received from the hot folder unit 4. As an example of other POD processing, the digital print unit 5 may copy a paper original document received from an operator by a monochrome multifunction peripheral (MFP) or a color MFP. Further, the digital print unit 5 may print out various types of files to a print device, such as a monochrome MFP or a color MFP, from a client personal computer (PC) via a printer driver. Examples of the various types of files include a document/image file received from the operator, a scan image file scanned by a scanning device, and a document/image file produced by editing such files.

If employing a postpress unit, the postpress unit controls a post-processing device based on a work instruction of a postpress job received from the hot folder unit 4 or the digital print unit 5. Examples of the post-processing devices include a paper folding machine, a saddle stitch bookbinding machine, a case binding machine, a cutting machine, an inserting machine, and a collating machine. The postpress unit can execute finishing processes such as, for example, paper folding, saddle stitch bookbinding, case binding, cutting, inserting, and collation of recording paper output from the digital print unit 5.

Figure 2:
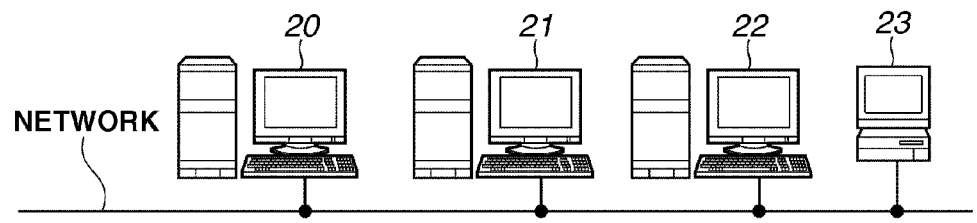
FIG. 2 illustrates an example of a hot folder unit configuration.

FIG. 2 illustrates an example of the configuration of the hot folder unit 4. The hot folder unit 4 includes a hot folder server (HF server) 20, a file server 21, and hot folder clients (HF clients) 22 and 23. Each of these apparatuses is connected to each other via a network.

The HF server 20 is an example of a management apparatus (computer) that manages the overall workflow of the POD system 3 from an acceptance of an order until delivery, and controls the HF clients 22 and 23.

The file server 21 stores content files for printing. More specifically, the file server 21 is a document management server that stores received content files which are used when re-ordering based on an identical document. For example, the file server 21 stores a content file (image data etc.) together with setting information about the previously-output print job (print instruction etc.).

The HF client 22 includes a content generation application which is an upstream system for inputting a content file into the hot folder unit 4 and issuing a printing instruction. The content generation application creates a content file to be used in printing. An HF client application is installed in each of the HF clients 22 and 23. The HF client application transmits the content file received from the content generation application (or received by an input operation performed by the operator) and a job definition format (JDF) file to the HF server 20. The HF server 20 generates a print job in a format that can be processed by the POD system 3, and outputs (submits) the generated print job to the digital print unit 5.

In the POD system 3, a JDF file is used for the print instruction (print instruction information) that is used among the HF server 20, the file server 21, and the HF clients 22 and 23. The JDF file is utilized in information exchange as a job ticket (JT) that describes a work instruction of the job. Further in the POD system 3, the JDF file is used to transfer print jobs and to issue control commands, so that the POD system 3 cooperates with the digital print unit 5 (as well as the postpress unit) with the hot folder unit 4 at the center to realize the automatization of the total work flow.

Figure 3:
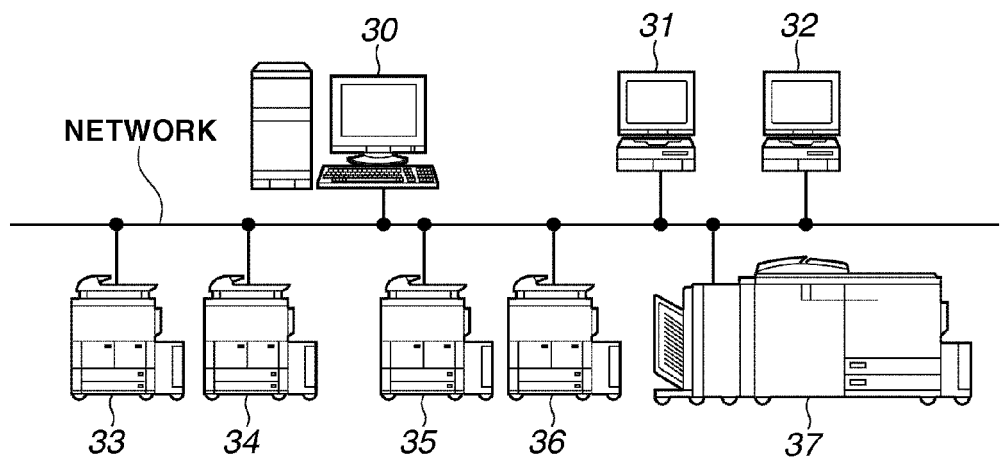
FIG. 3 illustrates an example of a digital print unit configuration.

FIG. 3 illustrates an example of the configuration of the digital print unit 5. The digital print unit 5 includes a print server 30, client PCs 31 and 32, monochrome MFPs 33 and 34, and color MFPs 35 to 37. One or a plurality of the print servers 30, the client PCs 31 and 32, the monochrome MFPs 33 and 34, and the color MFPs 35 to 37, respectively, may be present. These devices are connected to each other via the network.

The print server 30 has two main functions. One is for transmitting and receiving information externally to/from the digital print unit 5, so that, primarily, image information and setting information about an input job (including a print job) is input into the print server 30, and when the job is finished, information such as the status can be notified to an external unit. Another function is for managing and controlling the digital print unit 5, so that jobs input from the external unit and jobs produced in the digital print unit 5 can be managed in an integrated manner by the print server 30.

Further, the print server 30 monitors the situations of all the devices and all the jobs which are in the digital print unit 5, and performs control such as temporary stops, changes in the settings, and restart of printing of the job, or replication, movement and deletion of the job.

The client PCs 31 and 32 assist in monitoring and control of the devices and the jobs managed by the print server 30. Further, in other POD work, the client PCs 31 and 32 input an editing instruction and a print instruction of an application file input thereto, or a print ready file to the print server 30.

The monochrome MFPs 33 and 34 and the color MFPs 35 to 37 are an example of image forming apparatuses that have various functions, such as scanning, printing, and copying. Since the speed and costs of the color MFPs and the monochrome MFPs are different, these apparatuses are respectively employed based on the application. The color MFP 37 may be connected with a finishing apparatus.

Figure 4:
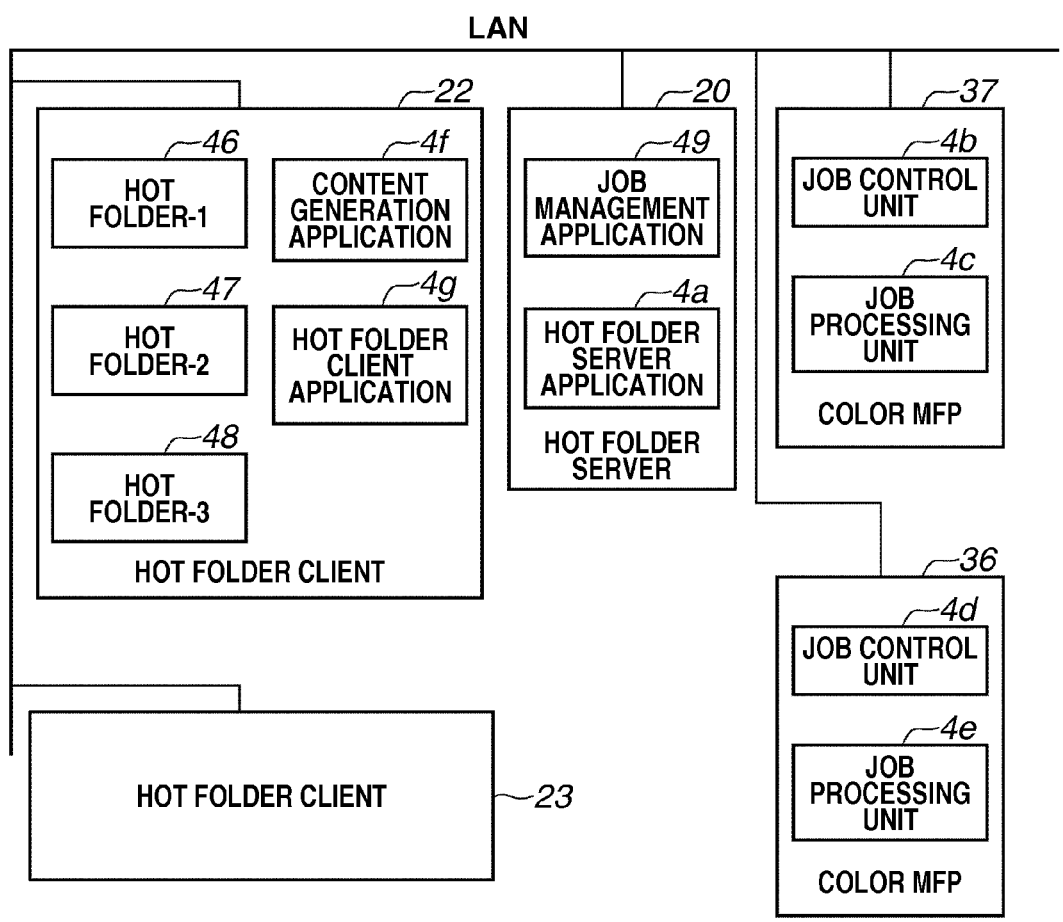
FIG. 4 illustrates an example of a POD system configuration.

FIG. 4 illustrates an example of the configuration of the POD system 3 that can be employed by the present exemplary embodiment. In this example, the hot folder unit 4 includes the HF clients 22 and 23 and the HF server 20. Further, the digital print unit 5 includes the color MFPs 36 and 37. The color MFP 37 includes a color MFP main body and an inline finisher. The color MFP main body, for example, receives a print job, and outputs a print original document based on information recorded in the print job. The inline finisher is a post-processing device, configured so that a paper conveyance path is physically connected with the color MFP main body. Each of the devices, such as the HF client 22, the HF server 20, and the color MFP 37 are connected to each other via the network such as a local area network (LAN).

In this example, the HF client 22 includes hot folders (hot folders 46 to 48), a content generation application 4*f*, and an HF client application 4*g*.

The content generation application 4*f* is an upstream system that provides a content file for printing in the hot folder. Further, when a content file is generated, the content generation application 4*f* copies the content file to the hot folder (in other words, stores file information about the content file in the hot folder).

The content file can also be input by having the operator issue an instruction to start printing. For example, the content file can be input by having the operator drag and drop the content file onto the hot folder with a mouse pointer. Further, the content file can also be input by executing a program such as a batch file, and copying the content file created by the content generation application 4*f*.

If the HF client application 4*g* detects based on an event that the content file is input, the HF client application 4*g* transfers the input content file to the HF server 20. The HF server 20 creates a print job from the received content file, and transfers the created print job to an instructed printer (the color MFP 37 etc.).

Since the hardware configuration of the HF clients 22 and 23, the HF server 20 and the like is the same hardware configuration as a common information processing apparatus, an illustration thereof is omitted here. For example, the HF server 20 includes a central processing unit (CPU), a memory, a storage device, an input device, a display device, a network interface card (NIC), and a system bus.

The CPU executes various processes based on programs stored in the memory. Further, the CPU performs overall control of the respective devices connected to the system bus. The memory functions as a main storage region and as a work area of the CPU. The storage device is an example of a storage unit, which is configured from a storage medium such as a hard disk (HD) or a flexible disk (FD). The storage device can store various programs and various pieces of data. The input device is configured by a keyboard, a mouse, and the like. The input device can be used by the user to issue instructions to a program executed by the HF server 20. The display device displays a graphical user interface (GUI), for example, of a program executed by the HF server 20. The NIC controls communication with other network apparatuses via the network, such as the LAN.

The CPU performs processing based on the procedures of the program stored in the storage device, so that the functions performed by the HF server 20 and the processing illustrated in the following flowchart can be realized.

The HF clients 22 and 23 also have the similar hardware configuration as the HF server 20. For example, each of the HF clients 22 and 23 includes a display device, which displays the contents of the hot folder. More specifically, the CPU of the HF clients 22 and 23 performs processing based on the procedures of the program stored in the storage device, so that the functions and processing performed by the HF clients 22 and 23 can be realized.

Figure 5:
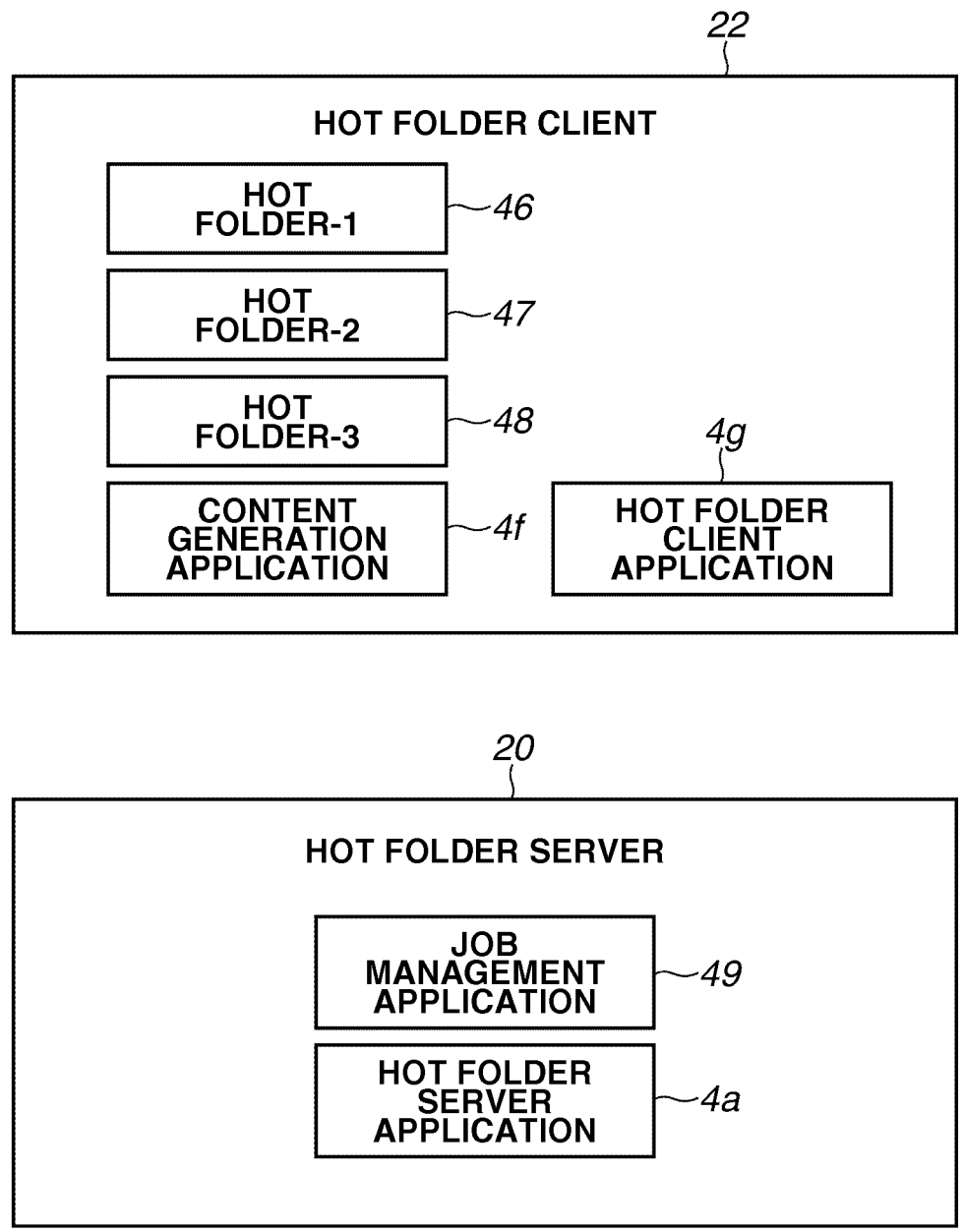
FIG. 5 illustrates a hot folder (HF) client and an HF server in more detail.

FIG. 5 illustrates the HF client 22 and the HF server 20 in more detail. The hot folders 46 to 48 store a content file input by the content generation application 4f.

An HF server application 4a manages a plurality of HF client applications. For example, when content files are received from a plurality of HF clients, the HF server application 4a manages (controls) the order of transmitting the generated print jobs to the HF server application 4a.

A job management application 49 transmits a print job transmitted from the HF server application 4a to the color MFP 37, and monitors and displays the status of the job relating to the transmitted print job. Further, the job management application 49 monitors the status of the color MFP 37.

Figure 6:
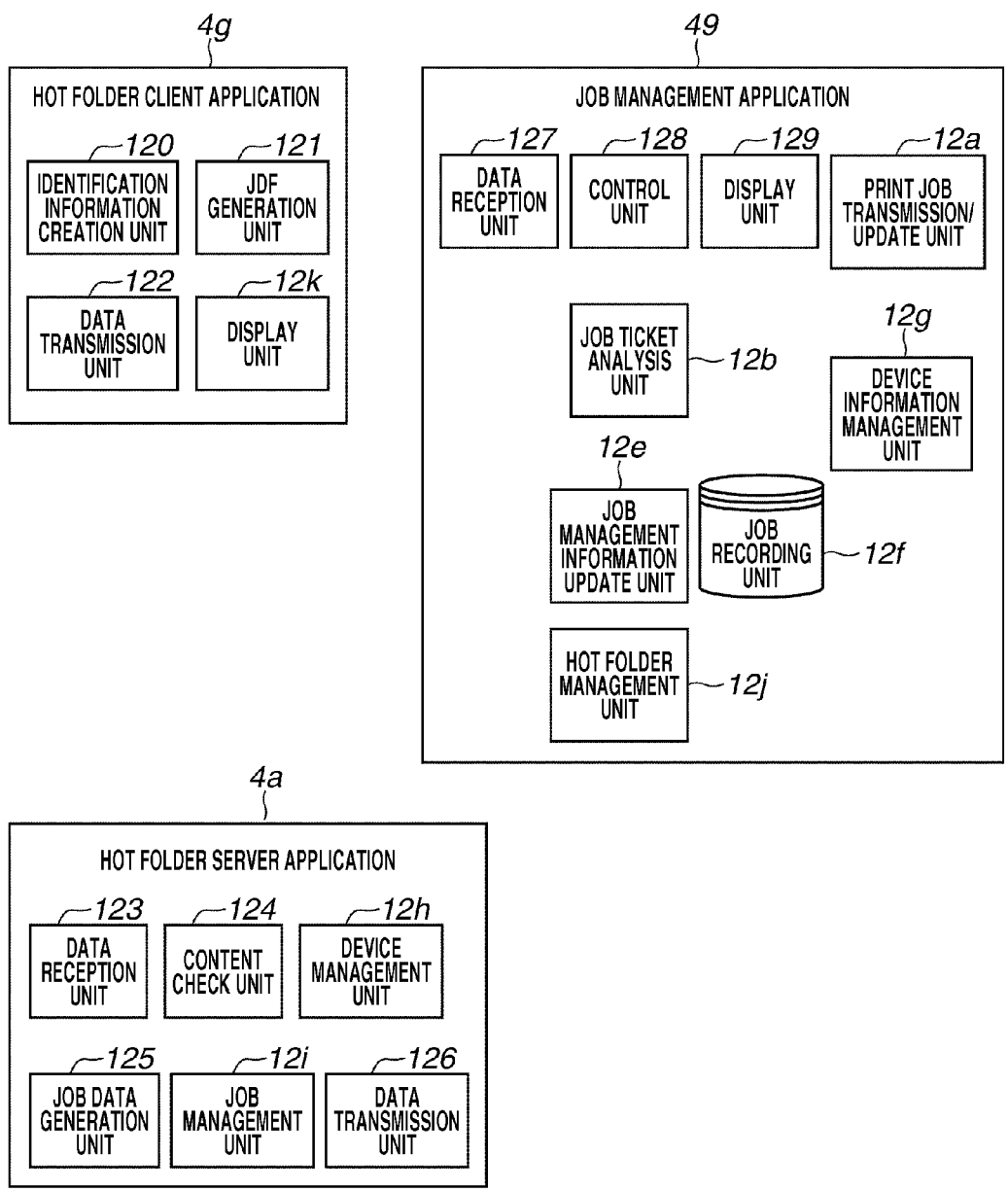
FIG. 6 illustrates a function configuration of various applications.

FIG. 6 illustrates function configurations of the HF client application 4g, the HF server application 4a, and the job management application 49. To enable a print job to be identified, an identification information creation unit 120 creates identification information which includes a hot folder name, a number (serial number) sequentially assigned to the content files input into the hot folder, and a content file input date. The identification information creation unit 120 creates the identification information when, for example, a content file is input into the hot folder 46.

A JDF generation unit 121 generates a JDF file that is print instruction information based on print instruction information set accompanying the hot folder. A display unit 12k provides a user interface (UI) for the HF client application 4g. The display unit 12k sets the hot folder settings, and displays a list of the content files input into the hot folder on the display device. A data transmission unit 122 transmits the input content files and the JDF file generated by the JDF generation unit 121 to the HF server application 4a.

A data reception unit 123 receives the content file transmitted from the data transmission unit 122 of the HF client application 4g. A content check unit 124 checks whether the received content file, which is a print target, is a support target. For example, the content check unit 124 refers to predefined check information that it possesses, and checks whether the type of the print target content file is appropriate, and whether the format version of the content file is appropriate.

A job data generation unit 125 generates JDF job data (print job) compliant with the JDF specification with using the received JDF file and content file and performing multipurpose internet mail extensions (MIME) encoding.

A data transmission unit 126 transmits the print job generated by the job data generation unit 125 to the job management application 49. A job management unit 12i manages the print jobs transmitted by the data transmission unit 126. For example, if there is a plurality of generated print jobs, the job management unit 12i manages the order of transmitting the print jobs to the job management application 49 (i.e., performs "queue control"). The printing destination of the print jobs is set in advance for each hot folder when the hot folder is created. The HF server application 4a has the set setting information. A device management unit 12h manages (records) configuration information about the color MFP 37 as the printing destination.

A data reception unit 127 receives the print jobs transmitted from the data transmission unit 126 of the HF server application 4a. A control unit 128 controls the processing of the entire job management application 49. A job ticket analysis unit 12b analyzes the JDF file which is a job ticket recorded in the received print job. For example, the job ticket analysis unit 12b acquires information about a print job transmission source (a hot folder name, an HF client name etc.) by analyzing the JDF file, and records the acquired information as job information in the recording device via a job management information update unit 12e and a job recording unit 12f.

The job management information update unit 12e updates the job information recorded in the recording device via the job recording unit 12f with the analysis result by the job ticket analysis unit 12b which is based on the print job received by the data reception unit 127. A display unit 129 displays job information managed by the job management information update unit 12e on a screen of the display device.

A print job transmission/update unit 12a transmits the print job from the job management application 49 to the color MFP 37. The print job transmission/update unit 12a which is an example of a job monitoring unit monitors job status information (printing progress information) in the color MFP 37. Further, the print job transmission/update unit 12a may receive the job status information from the color MFP 37, and record the job status information in the recording device via the job recording unit 12f. For example, when a print job is transmitted to the color MFP 37, the print job transmission/update unit 12a acquires information indicating that the job relating to the transmitted print job is currently being printed, being held, or that printing has finished as the status information.

The print job transmission/update unit 12a displays the updated status information on the screen of the display device via the display unit 129.

A device information management unit 12g which is an example of a device monitoring unit acquires device status information (state information) about the color MFP 37 or the like. For example, the device information management unit 12g acquires and manages (records) the size and type of paper set in the color MFP 37, and information about the finishing function that the color MFP 37 has.

A hot folder management unit 12j deletes the content file in the hot folder, and changes the hot folder name and write authority (write permitted/write not-permitted). The hot folder management unit 12j may also transmit an instruction to delete the content file and an instruction to change the hot folder name and the write authority to the HF client application 4g. In this case, the HF client application 4g executes processing based on the received instruction.

Figure 7:
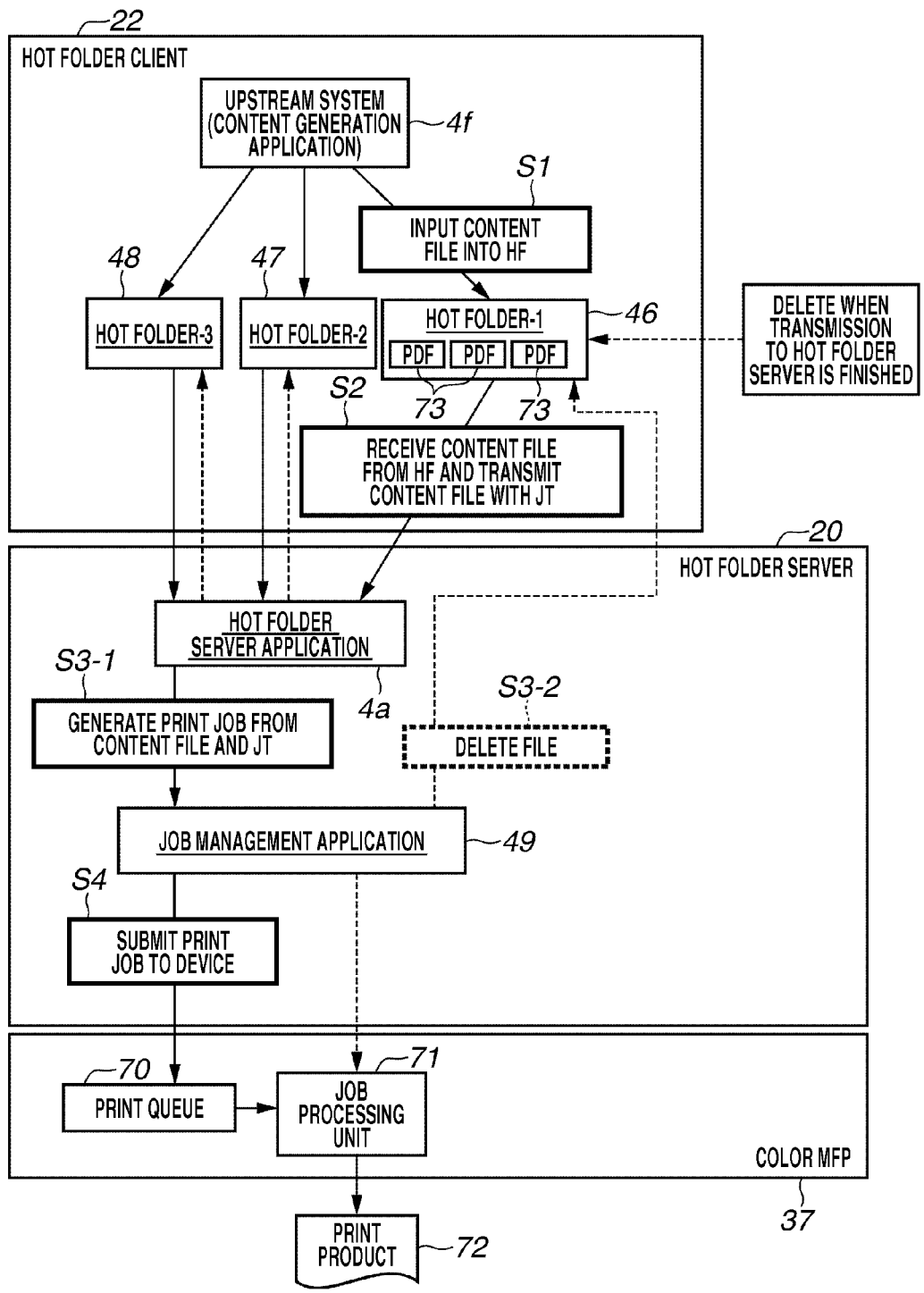
FIG. 7 illustrates an example of deletion processing.

FIG. 7 illustrates an example of the processing (deletion processing) from the input of the content file into the hot folder until the input content file is deleted. The content generation application 4f generates a content file. In step S1, the content generation application 4f (file input function) copies the content file into the hot folder (in this example, the hot folder 46). PDF files 73 are the copied content files.

In step S2, the HF client application 4g extracts the content file from the hot folder, and transmits the JDF file, which is a job ticket, and the content file to the HF server application 4a. In FIG. 7, the HF client application 4g is omitted from the drawing.

Then, in step S3-1, the HF server application 4a creates a print job based on the JDF file and the content file, and transmits the created print job to the job management application 49. When reception of the print job has finished, in step S3-2, the job management application 49 deletes the content file in the hot folder corresponding to the received print job. In step S4, the job management application 49 transmits (submits) the print job to the device (color MFP 37) associated with the hot folder 46.

In this example, the content file input into the hot folder is deleted at a timing unrelated to the finish of the print job printing.

Figure 8:
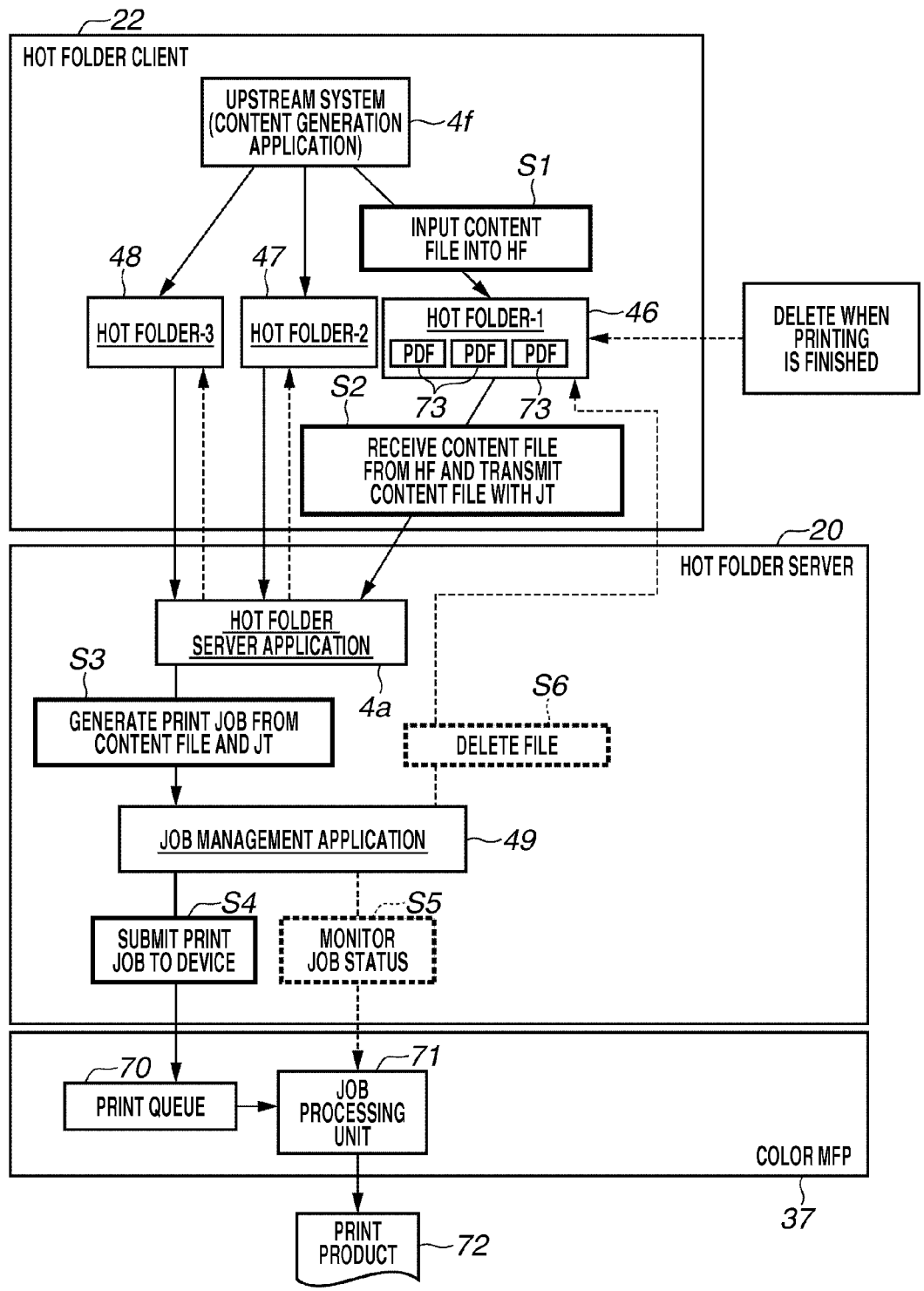
FIG. 8 illustrates an example of deletion processing.

FIG. 8 illustrates an example of the processing (deletion processing) from the input of the content file into the hot folder until the input content file is deleted. The parts of FIG. 8 that are the same as the example illustrated in FIG. 7 are denoted with the same reference numerals, and a description thereof is omitted as appropriate.

In step S3, the HF server application 4a creates a print job based on the JDF file and the content file, and transmits the created print job to the job management application 49.

In step S4, the job management application 49 transmits the print job to the device (in this example, the color MFP 37) associated with the hot folder 46. After the transmission, in step S5, the job management application 49 performs job monitoring in order to determine whether printing processing has finished. If the job management application 49 detects that printing has finished based on status information indicating that the printing of jobs in each content file has finished, the processing proceeds to step S6. In step S6, the content file in the hot folder corresponding to the job for which printing has finished is deleted.

In this example, the content file input into the hot folder is deleted when job printing is finished.

Figure 9:
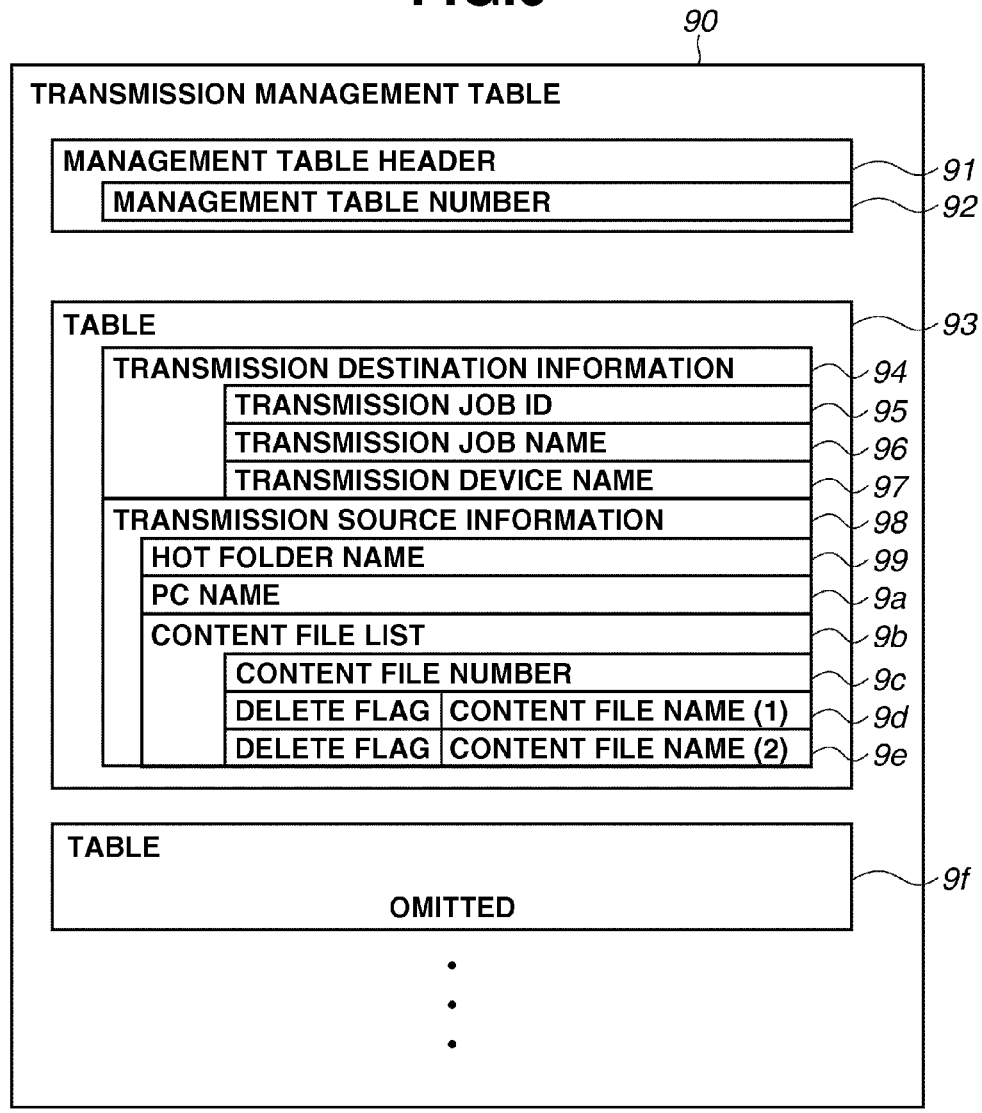
FIG. 9 illustrates an example of a transmission management table.

FIG. 9 illustrates an example of a transmission management table. A transmission management table 90 is used to manage the print job (transmission job) transmitted by the job management application 49. The transmission management table 90 includes a management table header 91 and tables (table 93, 9f, and etc.).

The management table header 91 includes a management table number 92. The management table number 92 indicates the number of tables managed by the transmission management table 90. The table 93 shows information about one transmission job. The table 93 includes transmission destination information 94 and transmission source information 98. The transmission destination information 94 includes information about a transmission job identification (ID) 95, a transmission job name 96, and a transmission device name 97.

The transmission source information 98 includes information about a hot folder name 99, a PC name (HF client name) 9a, and a content file list 9b. The content file list 9b includes a content file number 9c, and information about a deletion flag and a content file name (content state information 9d and 9e). The content file number 9c indicates the number of content files. The deletion flag indicates whether a content file is deleted (has already been deleted) or not. The deletion flag and the content file name are provided for each content file. The example in FIG. 9 indicates the number of content files is two.

Further, the table 9f shows information about a second transmission job. Since the data structure of the table 9f is the same as that of the table 93, a description thereof is omitted. Further, tables are provided corresponding to the number of the transmission jobs.

Figure 10:
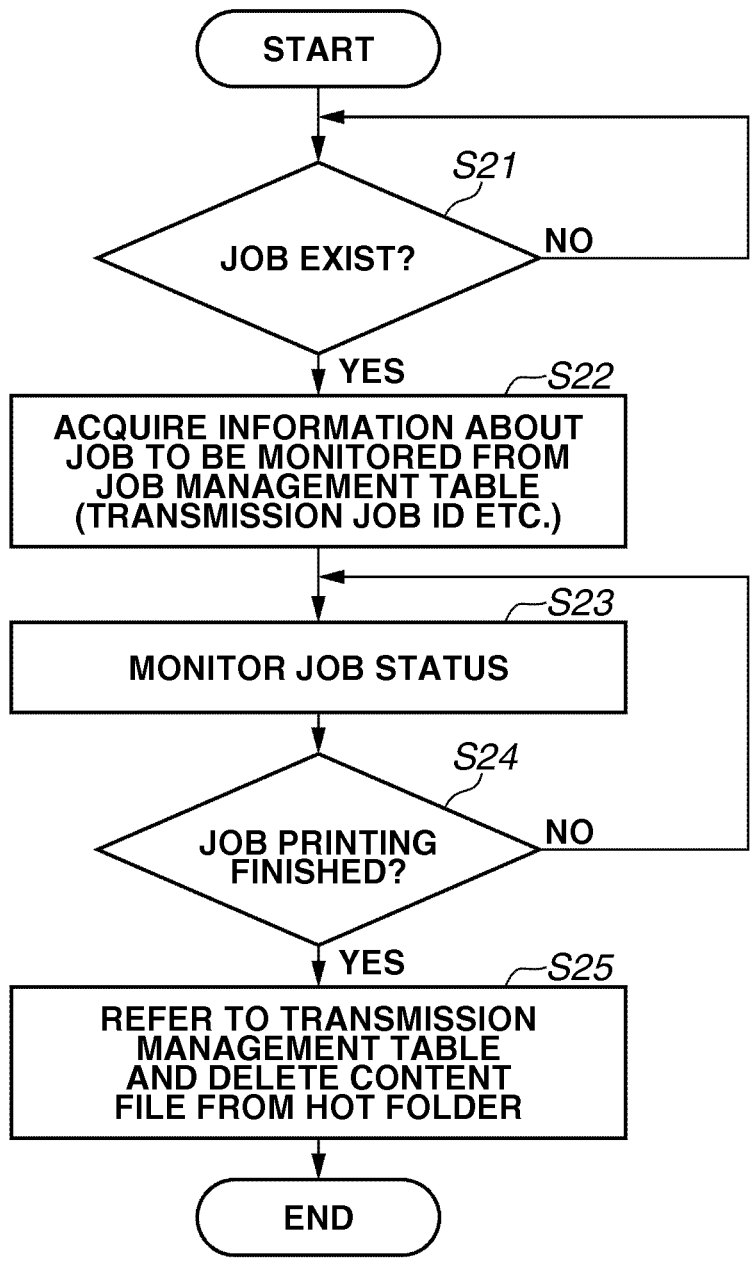
FIG. 10 is a flowchart illustrating processing performed by the HF server.

FIG. 10 illustrates an example of a flowchart relating to the processing performed by the job management application 49.

First, in step S21, the job management application 49 determines whether there is a job relating to the print job (transmission job) transmitted to the device (color MFP 37 etc.). If the job management application 49 determines that there is a job (YES in step S21), the processing proceeds to step S22. Whereas if the job management application 49 determines that there is no job (NO in step S21), the processing in step S21 is repeated.

In step S22, the job management application 49 acquires information (transmission job ID etc.) about the job (monitored job) relating to the transmission job by referring to the transmission management table. Next, in step S23, using the information acquired in step S22, the job management application 49 monitors the status information about the job relating to the transmission job. The status information includes information indicating the progress state of the job, a transmission job ID, and information about the content file name that is the object of printing by the job.

Then, in step S24, the job management application 49 determines whether job printing has finished based on the status information. If the job management application 49 determines that job printing has finished (YES in step S24), the processing proceeds to step S25, whereas if the job management application 49 determines that job printing has not finished (NO in step S24), the processing returns to step S23.

In step S25, the job management application 49 again refers to the transmission management table to specify the hot folder for storing the content file corresponding to the job for which printing has finished and deletes the content file in the specified hot folder. Further, the job management application 49 sets the deletion flag corresponding to the content file name to "deleted", and updates the update management table.

In a second exemplary embodiment, an example is described in which a personalized printing markup language (PPML) file used in variable printing is employed as a content file.

Figure 11:
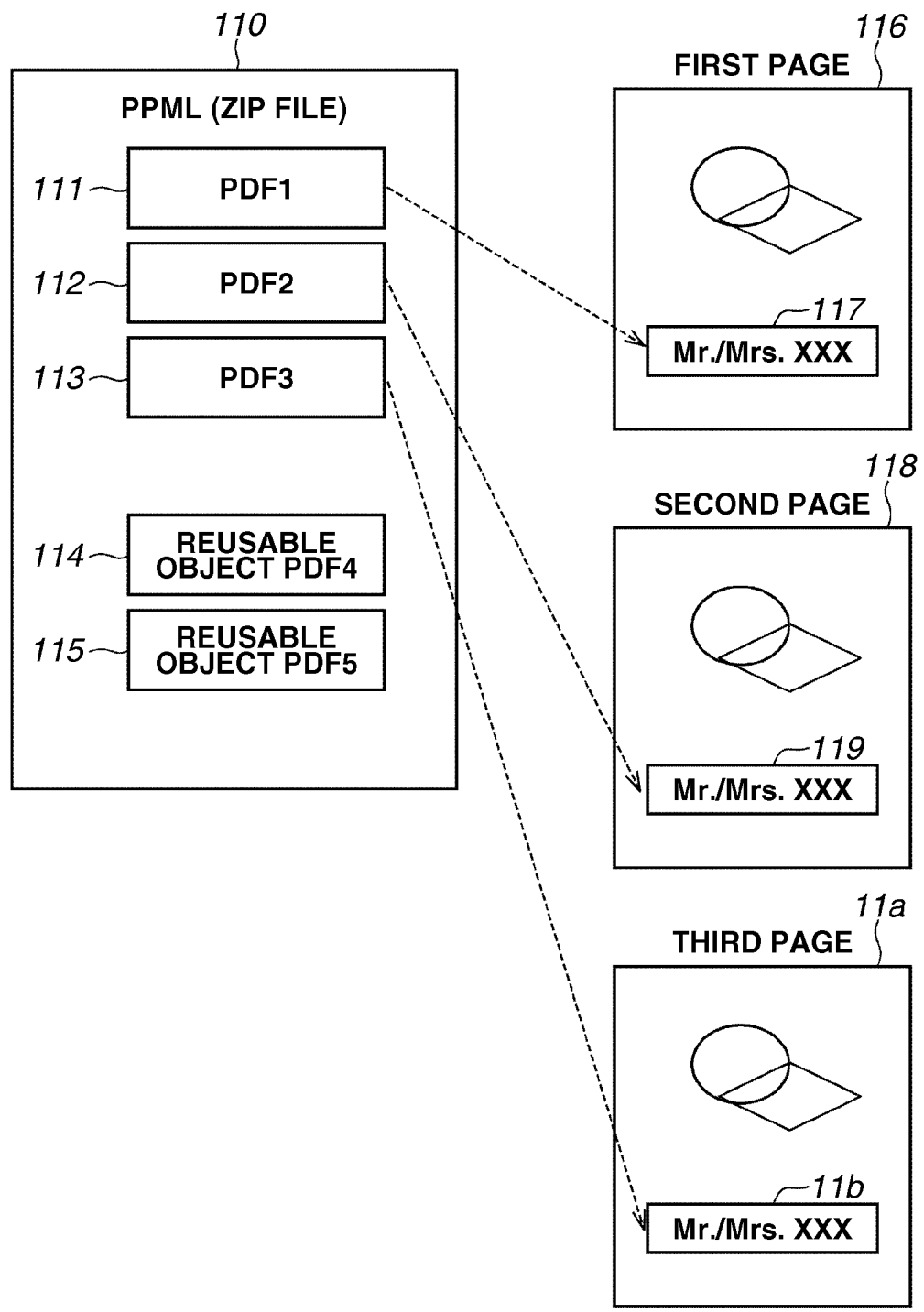
FIG. 11 illustrates an example of a personalized printing markup language (PPML) file.

FIG. 11 illustrates an example (PPML data 110) of a PPML file for variable printing of three pages.

A PDF 111 is variable data used in the printing of a first page. A PDF 112 is variable data used in the printing of a second page. A PDF 113 is variable data used in the printing of a third page. A PDF 114 represents data (common data) used in a shared manner, which is a reusable object compliant with the PPML specification. Similar to the PDF 114, a PDF 115 is data (reusable data) used in a shared manner.

Page data 116 represents a first page when the PPML data 110 is variably printed, and a variable display 117 shows the printing contents corresponding to the variable data 111. Further, page data 118 and a variable display 119, and page data 11a and a variable display 11b are similar.

If such a PPML file is input into the hot folder and printed, when the job management application 49 determines that printing of the first page has finished, it deletes the PDF 111 from the hot folder. Further, when the job management application 49 determines that printing of the second page has finished, it deletes the PDF 112 from the hot folder, and when the job management application 49 determines that printing of the third page has finished, it deletes the PDF 113 from the hot folder. Thus, in the present exemplary embodiment, if a plurality of pieces of the content data is used in a single file, when printing of a page using one piece of content data finishes, the piece of content data is deleted even though not all of the pages have finished being printed.

Figure 12:
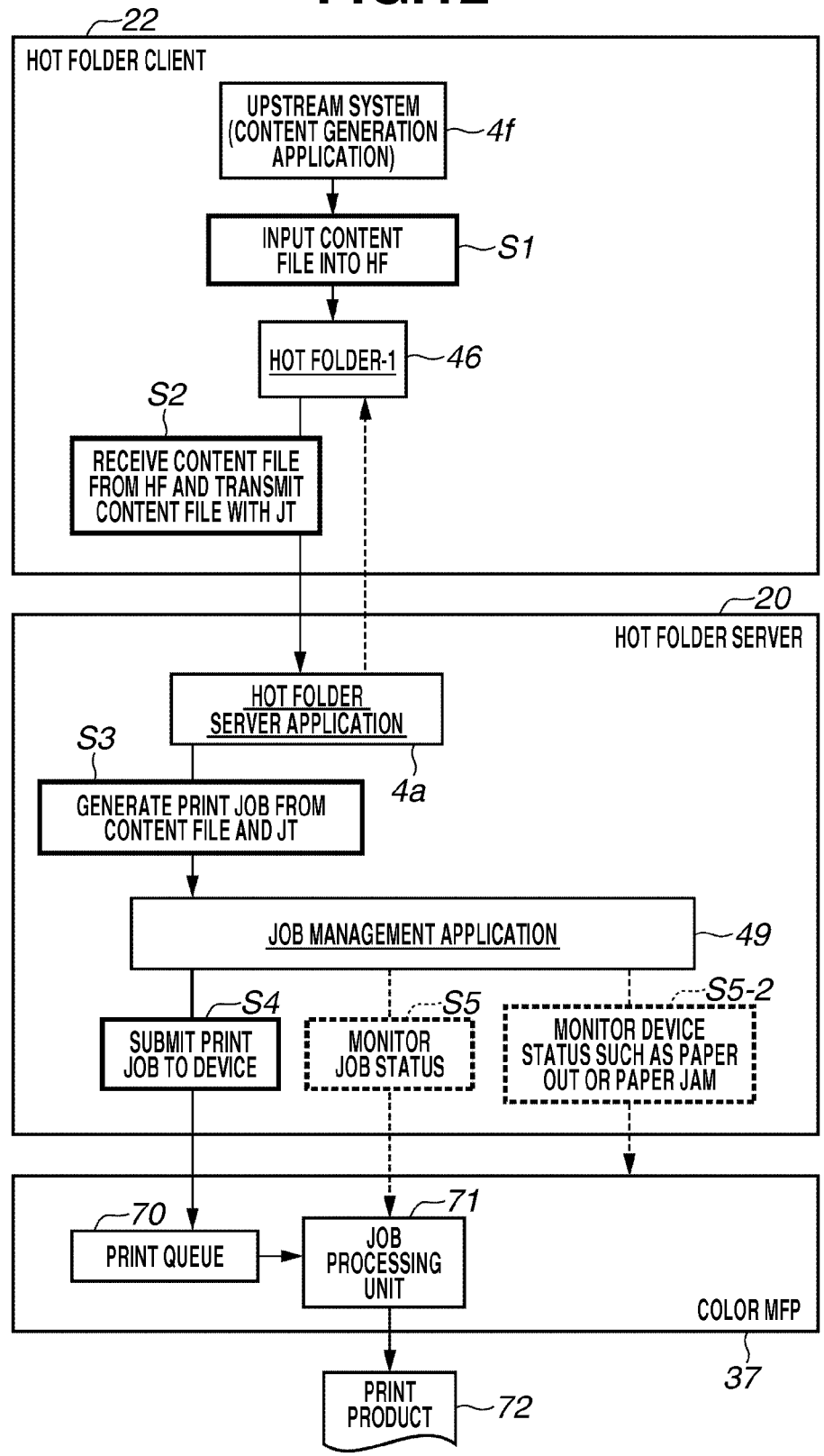
FIG. 12 illustrates an example of processing performed when an error occurs.

FIG. 12 illustrates an example of the processing from input of a content file into the hot folder until an error, such as paper running out or jamming, occurs in the printing destination device (color MFP 37 etc.) (example of processing performed when an error occurs). The parts of FIG. 12 that are the same as the example illustrated in FIG. 8 are denoted with the same reference numerals, and a description thereof is omitted as appropriate.

In a third exemplary embodiment, after step S5, the job management application 49 monitors whether an error such as paper running out or jamming, for example, has occurred by monitoring the device status based on the device status information that includes error information about paper running out, jamming and the like. If an error is detected (found), the job management application 49 displays the details of the error on the screen of the display device.

In this example, if a device error is detected, the details of the error are only announced (notified to the user), and the printing processing from the hot folder is continued.

Figure 13:
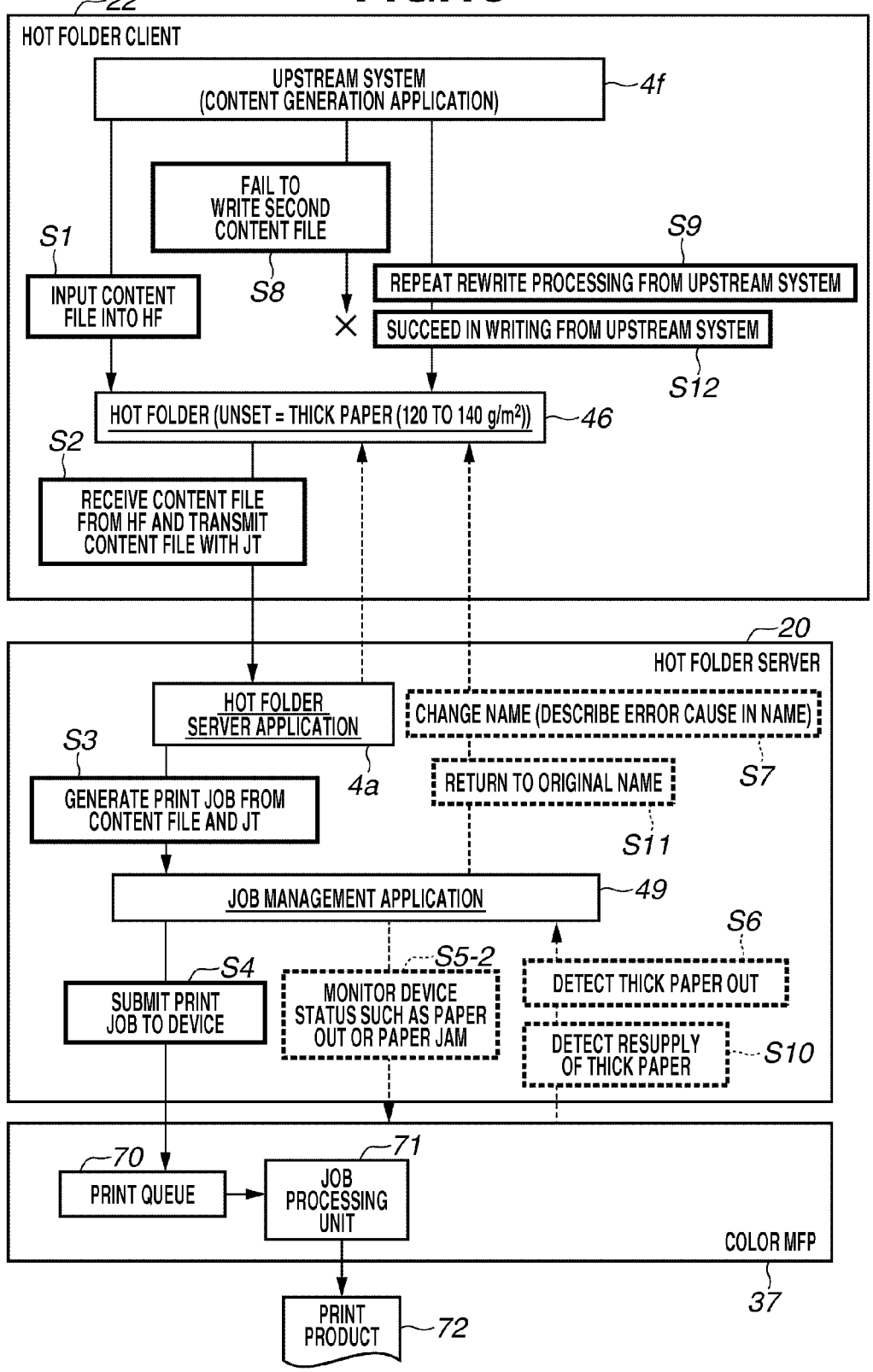
FIG. 13 illustrates an example of processing performed when an error occurs.

FIG. 13 illustrates an example of the processing that is performed when an error occurs in the device and until the name of the hot folder is changed and the state of the device is known (processing performed when an error occurs). The parts of FIG. 13 that are the same as the example illustrated in FIG. 12 are denoted with the same reference numerals, and a description thereof is omitted as appropriate.

Here, the processing for automatically copying the content file is prescribed in the content generation application 4f, so that when a file is generated by the content generation application 4f, printing is started.

In step S1, the content generation application 4f inputs a first content file into the hot folder. Next, in step S2, the HF client application 4g transmits the content file and a job ticket (JDF file) to the HF server application 4a.

Then, in step S3, the HF server application 4a transmits a print job that is created based on the content file and the JDF file to the job management application 49. Next, in step S4, the job management application 49 transmits the print job to the color MFP 37. In step S5-2, the job management application 49 monitors whether an error, such as paper running out or jamming, has occurred. In this example, it will be assumed that an error indicating that thick paper has run out has occurred. Therefore, in step S6, the job management application 49 acquires the device status information including error information that the thick paper has run out. In step S7, the job management application 49 changes the name of the hot folder.

In the present exemplary embodiment, the hot folder name is changed so as to indicate the error details. For example, although the pre-change name is "hot folder-1", the name is changed to "hot folder (unset=thick paper (120 to 140 g/m²))". Then, when a second content file is input into the hot folder from the content generation application 4f, in step S8, the input of the content file into the hot folder fails. This is because the processing is prescribed in the content generation application 4f so that the content file is input into the hot folder with the name "hot folder-1". Since the content file input failed, in step S9, the content generation application 4f repeats the input of the content file until the content file is successfully input.

In step S10, when the job management application 49 detects that the thick paper has been resupplied to the color MFP 37, the processing proceeds to step S11. In step S11, the job management application 49 returns the hot folder to its original name. Then, since the folder has returned to its original name, in step S12, the content generation application 4f successfully inputs the content file into the hot folder.

According to the above configuration, the operator can easily grasp the state of the devices. Further, according to the above configuration, the operator can easily change the printing destination by inputting the content file into another hot folder (another color MFP).

Figure 14:
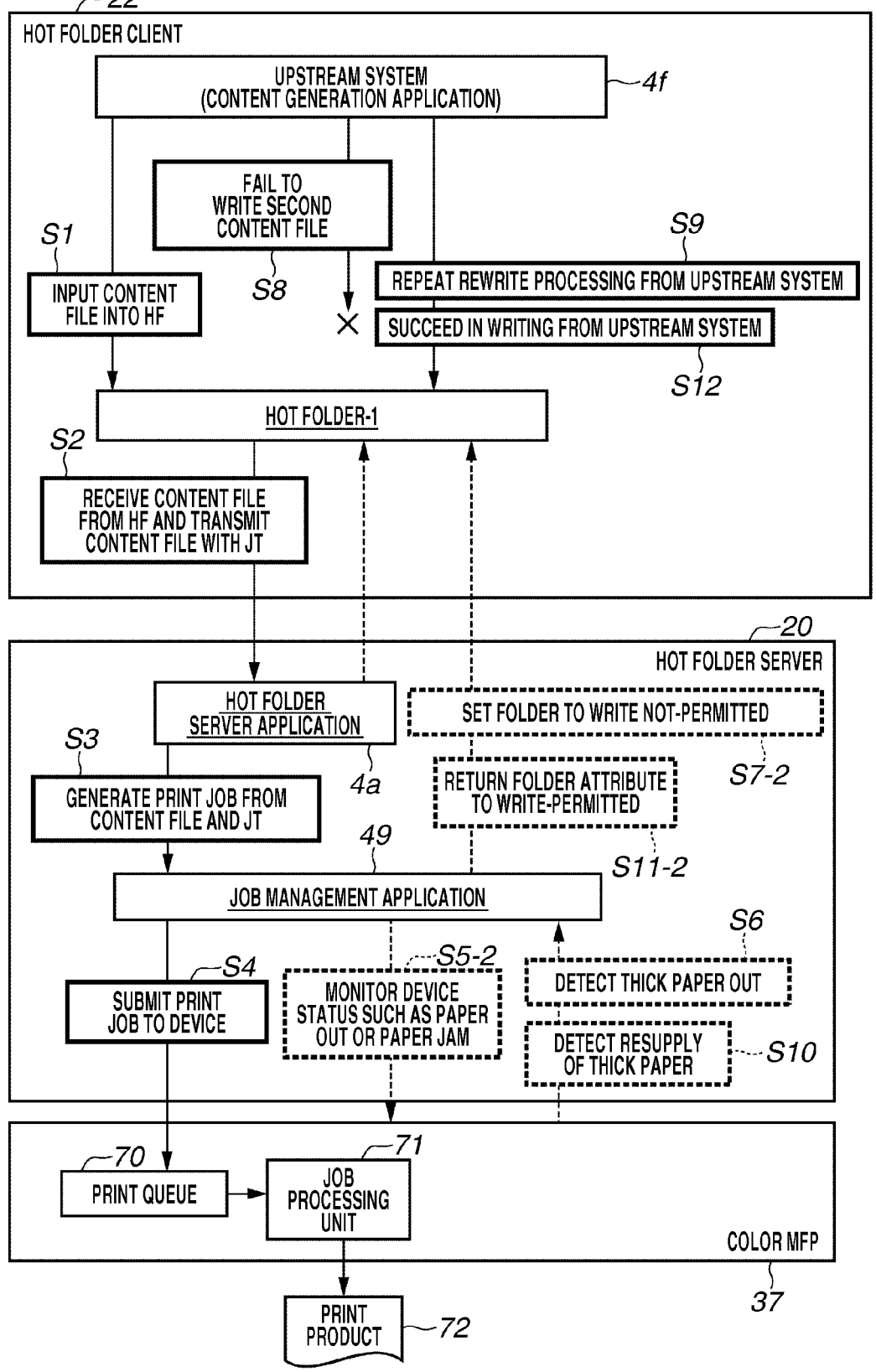
FIG. 14 illustrates an example of processing performed when an error occurs.

As a fourth exemplary embodiment, FIG. 14 illustrates an example of processing in which, when an error occurs in the device (color MFP 37 etc.), the access authority of the hot folder is changed so that a content file cannot be input, to prevent print-standby jobs from accumulating in the device (example of processing performed when an error occurs). The parts of FIG. 14 that are the same as the example illustrated in FIG. 13 are denoted with the same reference numerals, and a description thereof is omitted as appropriate.

In step S7-2, the job management application 49 changes the access authority of the hot folder to write not-permitted (in other words, sets the authority to deny input of a content file into the hot folder). Then, similar to step S8 in FIG. 13, the content generation application 4f fails to input a content file into the hot folder. In step S9, the content generation application 4f repeats the input of the content file into the hot folder. At this stage, the display device of the HF client 22 displays an error message.

In step S10, the job management application 49 detects that the thick paper has been resupplied to the color MFP 37. Then, in step S11-2, the job management application 49 returns the hot folder to its original access authority. In step S12, the content generation application 4f successfully inputs the content file into the hot folder.

According to the above configuration, occurrence of the accumulation of a large number of jobs that cannot be printed by the device can be prevented as much as possible. Further, the operator can easily change the printing destination by inputting the content file into another hot folder.

Figure 15:
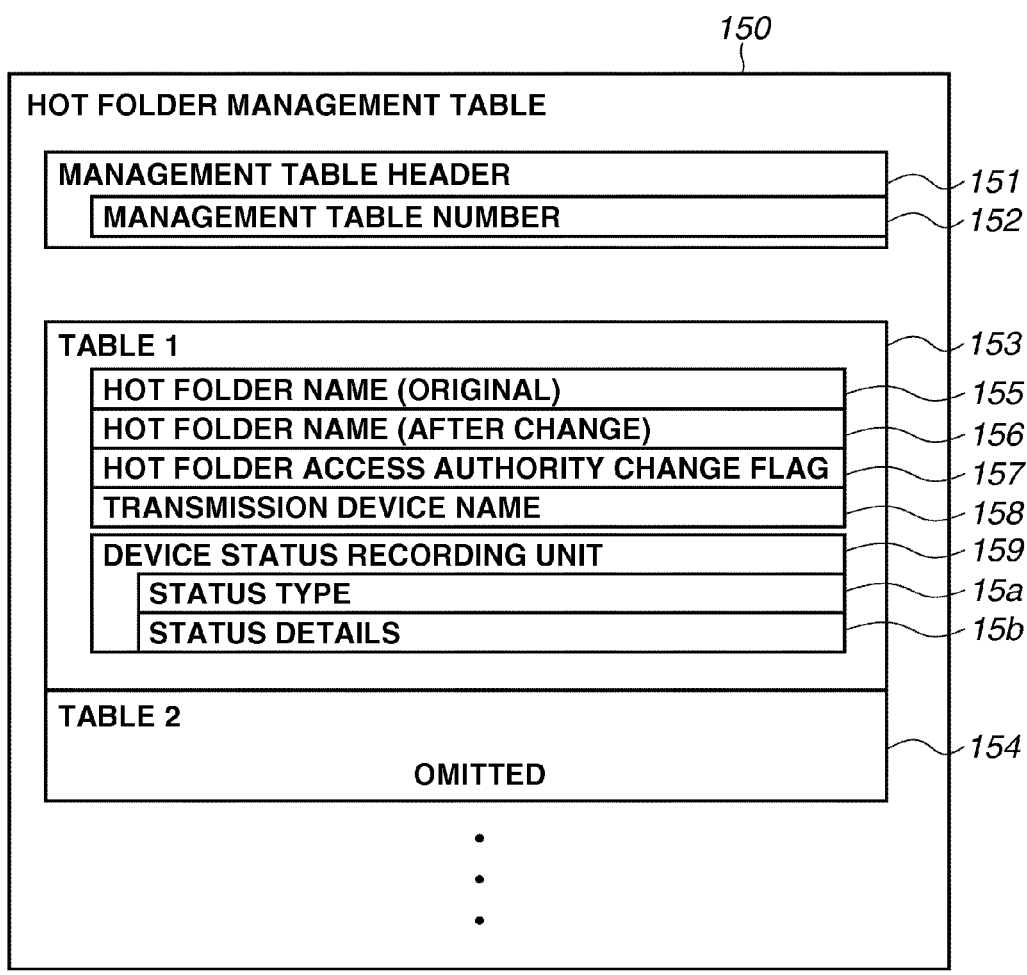
FIG. 15 illustrates an example of a hot folder management table.

FIG. 15 illustrates an example of a hot folder management table. A hot folder management table 150 is managed by the job management application 49. The hot folder management table 150 includes information about a management table header 151 and tables (table 153, 154 etc.).

The management table header 151 includes a management table number 152. The management table number 152 indicates the number of tables managed by the hot folder management table 150. The tables 153 and 154 are provided for each hot folder. The table 153 includes information about a hot folder name (original) 155, a hot folder name (after change) 156, a hot folder access authority change flag 157, a transmission device name 158, and a device status recording unit 159. The hot folder access authority change flag 157 indicates whether the access authority of the hot folder is changed to write not-permitted. For example, if the flag is set to ON, this indicates that the access authority is changed to write not-permitted. The device status recording unit 159 includes information about a status type 15a and status details 15b. As an additional remark, the third exemplary embodiment also employs a similar management table.

FIG. 16 illustrates an example of information (device status information) recorded in the device status recording unit 159 for a case in which the thick paper (120 to 140 g/m²) has run out.

Figure 17:
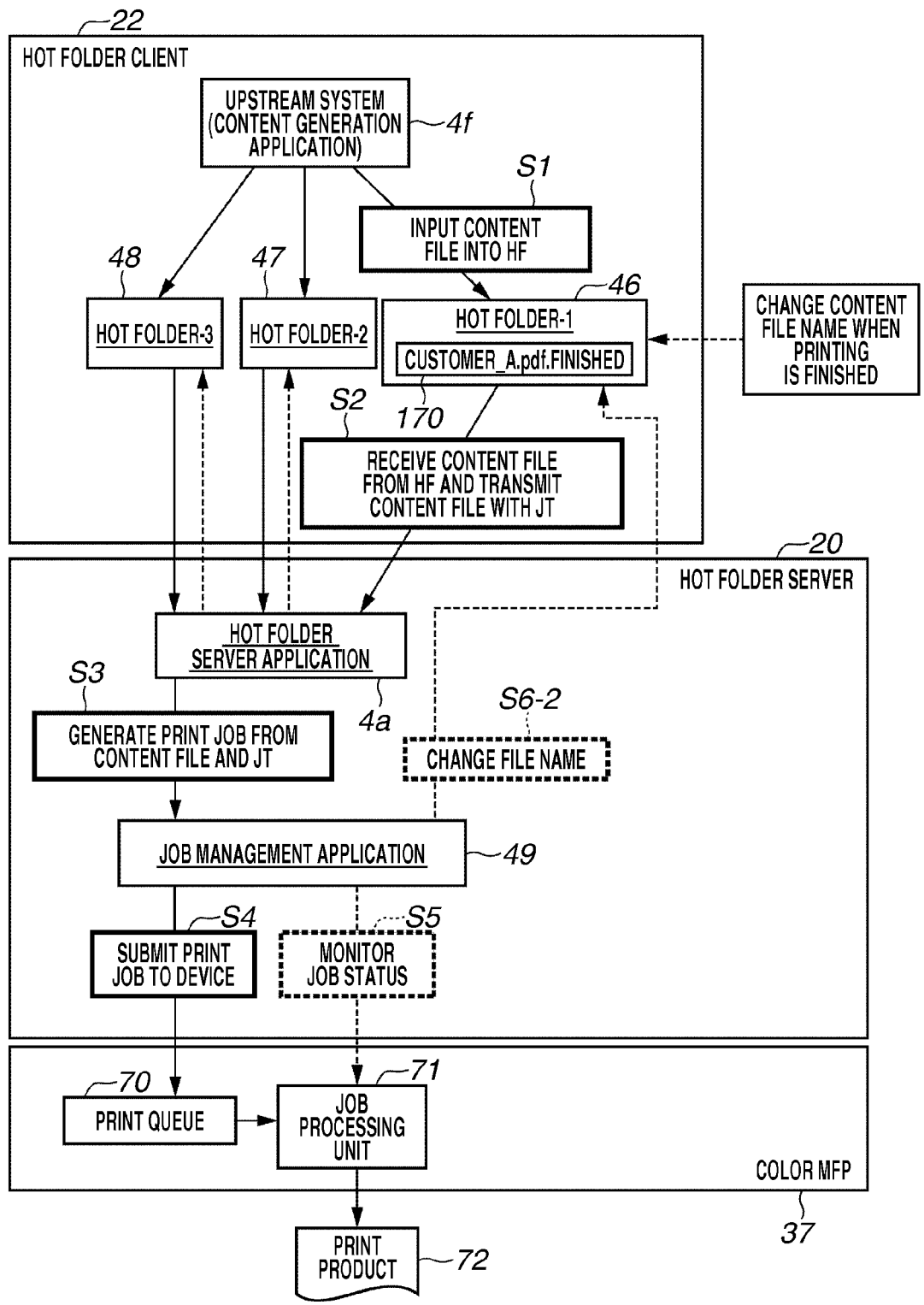
FIG. 17 illustrates an example of processing performed when printing finishes.

As a fifth exemplary embodiment, FIG. 17 illustrates an example of processing which enables the operator to know when printing has finished (processing performed when printing finishes) by changing the file name when printing finishes to "original file name" with ".finished". The parts of FIG. 17 that are the same as the example illustrated in FIG. 8 are denoted with the same reference numerals, and a description thereof is omitted as appropriate.

In step S6-2, the job management application 49 changes the name of a content file in the hot folder for which printing has finished. In this case, an example is illustrated in which the pre-change name of "customer_A.pdf" is changed to "customer_A.pdf.finished".

Figure 18:
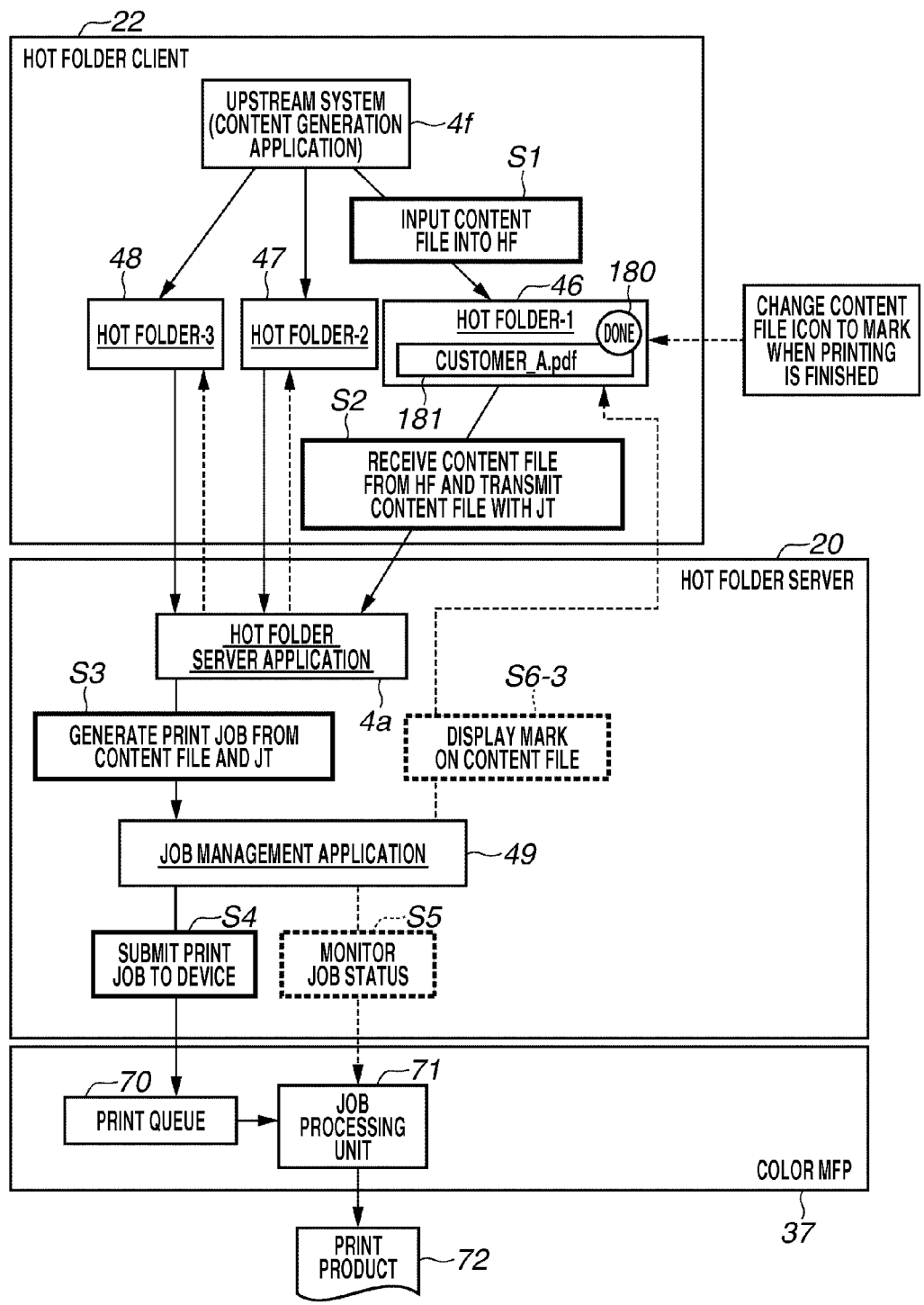
FIG. 18 illustrates an example of processing performed when printing finishes.

As a sixth exemplary embodiment, FIG. 18 illustrates an example of processing which enables the operator to know when printing has finished (processing performed when printing finishes) by marking the file when printing finishes with an icon. The parts of FIG. 18 that are the same as the example illustrated in FIG. 8 are denoted with the same reference numerals, and a description thereof is omitted as appropriate.

In step S6-3, the job management application 49 sets information for displaying on the display device of the HF client 22 a mark on the content file in the hot folder that indicates that printing has finished. In this case, an example is illustrated in which a "done" mark is displayed on an icon of a content file for which printing has finished.

FIG. 19 illustrates a display example of a screen in the display device of the HF client 22. A screen 190 is an example of a screen displayed on the display device in which the HF client application 4g displays a list of the content files in the hot folder 46. In this example, two content files have been input into the hot folder, a "customer_A.pdf" file 181 and a "customer_B.pdf" file 191. A "done" mark 180 is displayed for the file 181, indicating the printing of the file 181 has finished.

According to above described exemplary embodiments, a user can easily and appropriately determine whether printing of a file input into a folder has finished.

Aspects of the present invention can also be realized by a computer of a system or apparatus (or devices such as a CPU or micro-processing unit (MPU)) that reads out and executes a program recorded on a memory device (storage medium) to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program may be provided to the computer for example via a network or from a recording medium of various types serving as the memory device (e.g., computer-readable medium). The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-117427 filed May 21, 2010, which is hereby incorporated by reference herein in its entirety.

What is claimed is:

1. A management apparatus comprising:
 a reception unit configured to receive file information about a file input into a folder;
 a transmission unit configured to generate print job information including the file information and transmit the print job information to an image forming apparatus that is associated with the folder in advance;
 a device monitoring unit configured to monitor whether the image forming apparatus is in a printable state or not based on state information about the image forming apparatus; and
 a setting unit configured to, if the image forming apparatus is determined by the device monitoring unit not to be in the printable state, change an access authority of the folder to write not-permitted so that a file cannot be input into the folder and change a name of the folder into a name including error information indicating details of an error according to a device status of the image forming apparatus, and if the image forming apparatus is determined by the device monitoring unit to be in the printable state after the access authority of the folder has been changed to write not-permitted so that a file cannot be input into the folder, reset the access authority of the folder so that a file can be input into the folder and reset the name of the folder.

2. The management apparatus according to claim 1, further comprising:
 a job monitoring unit configured to monitor whether printing of a job corresponding to the file information included in the print job information by the image forming apparatus has been finished based on printing progress information received from the image forming apparatus; and
 a folder management unit configured to, if printing of the job is determined by the job monitoring unit to have been finished, change a name of the file information to a name indicating that printing of the file information has finished.

3. The management apparatus according to claim 1, further comprising:
 a job monitoring unit configured to monitor whether printing of a job corresponding to the file information included in the print job information by the image forming apparatus has been finished based on printing progress information received from the image forming apparatus; and
 a folder management unit configured to, if printing of the job is determined by the job monitoring unit to have been finished, display information indicating that printing of the file information has finished on an external display device.

4. A method of management executed by a management apparatus, the method comprising:
 receiving file information about a file input into a folder;
 generating print job information including the file information and transmitting the print job information to an image forming apparatus that is associated with the folder in advance;
 monitoring whether the image forming apparatus is in a printable state or not based on state information about the image forming apparatus; and
 changing, if the image forming apparatus is determined by the device monitoring unit not to be in the printable state, an access authority of the folder to write not-permitted so that a file cannot be input into the folder and changing a name of the folder into a name including error information indicating details of an error according to a device status of the image forming apparatus, wherein if the image forming apparatus is determined by the device monitoring unit to be in the printable state after the access authority of the folder has been changed to write not-permitted so that a file cannot be input into the folder, the access authority of the folder is reset so that a file can be input into the folder and resetting the name of the folder.

5. The method according to claim 4, the method further comprising:
monitoring whether printing of a job corresponding to the file information included in the print job information by the image forming apparatus has been finished based on printing progress information received from the image forming apparatus; and
changing, if printing of the job is determined to have been finished, a name of the file information to a name indicating that printing of the file information has finished.

6. The method according to claim 4, the method further comprising:
monitoring whether printing of a job corresponding to the file information included in the print job information by the image forming apparatus has been finished based on printing progress information received from the image forming apparatus; and
displaying, if printing of the job is determined to have been finished, information indicating that printing of the file information has finished on an external display device.

7. A non-transitory computer-readable storage medium that stores a program of instructions for causing a computer to perform the method of claim 4.

8. A non-transitory computer-readable storage medium that stores a program of instructions for causing a computer to perform the method of claim 5.

9. A non-transitory computer-readable storage medium that stores a program of instructions for causing a computer to perform the method of claim 6.

10. The management apparatus according to claim 1, further comprising:
a job monitoring unit configured to monitor whether printing of a job corresponding to the file information included in the print job information by the image forming apparatus has been finished based on printing progress information received from the image forming apparatus; and
a folder management unit configured to, if printing of the job is determined by the job monitoring unit to have been finished, delete the file information corresponding to the job from the folder.

11. The method according to claim 4, further comprising:
monitoring whether printing of a job corresponding to the file information included in the print job information by the image forming apparatus has been finished based on printing progress information received from the image forming apparatus; and
deleting, if printing of the job is determined to have been finished, the file information corresponding to the job from the folder.

* * * * *